United States Patent [19]

Saltzman et al.

[11] Patent Number: 4,758,913
[45] Date of Patent: Jul. 19, 1988

[54] METHOD AND APPARATUS FOR PREVENTING AMBIGUITY IN DISPLAYING THE NUMBER OF A RECORDED MESSAGE THAT HAS BEEN REACHED

[75] Inventors: Jeremy Saltzman, Norwalk; Betsy Hipp, Orange; John J. Dwyer, Stratford, all of Conn.

[73] Assignee: Dictaphone Corporation, Rye, N.Y.

[21] Appl. No.: 851,810

[22] Filed: Apr. 14, 1986

Related U.S. Application Data

[63] Continuation of Ser. No. 729,980, May 2, 1985, abandoned.

[51] Int. Cl.$^4$ .................. G11B 27/13; G11B 27/28
[52] U.S. Cl. ........................... 360/72.1; 360/72.2; 360/72.3; 369/25
[58] Field of Search ................ 360/72.1–72.3, 360/74.1, 74.2, 74.4, 71, 79, 13, 14.1–14.3, 69, 137; 369/25, 27, 28; 377/18

[56] References Cited

U.S. PATENT DOCUMENTS

| | | | |
|---|---|---|---|
| 4,200,893 | 4/1980 | Matison | 360/72.1 |
| 4,224,644 | 9/1980 | Lewis et al. | 360/72.2 |
| 4,530,106 | 7/1985 | Kato | 377/18 |

Primary Examiner—Raymond F. Cardillo
Assistant Examiner—Steven R. Garland
Attorney, Agent, or Firm—Robert H. Whisker; Melvin J. Scolnick; David E. Pitchenik

[57] ABSTRACT

A method and apparatus for indicating the number of the particular message that has been reached on a bi-directionally movable record medium used with a record/playback device. A position count is incremented and decremented as the record medium moves in forward and reverse directions, respectively; and end-of-message counts representing the locations of the ends of messages relative to an arbitrary reference location of the record medium are stored. Information representing the number of each message whose end-of-message count is stored is provided; and the number of the message which has been reached is determined as a function of which stored end-of-message count is greater than the present position count and which stored end-of-message count is less than that position count. To prevent ambiguities in determining the number of the message which has been reached, as when a new, partially used record medium is loaded into the record/playback device and is reversed to a location which precedes the reference location (i.e. the starting point of the record medium when it is loaded into the device), the position count is preset to a predetermined count when the record medium is replaced. This predetermined count is sufficient to prevent decrementing of the position count below zero, which would be interpreted as being greater than any of the stored end-of-message counts, even if the full amount of the newly-loaded record medium moves in the reverse direction.

15 Claims, 3 Drawing Sheets

METHOD AND APPARATUS FOR PREVENTING AMBIGUITY IN DISPLAYING THE NUMBER OF A RECORDED MESSAGE THAT HAS BEEN REACHED

This application is a continuation of application Ser. No. 729,980, filed May 2, 1985, now abandoned.

BACKGROUND OF THE INVENTION

This invention relates to a display for a record/playback device and, more particularly, to such a display which unambiguously indicates the number of the particular message that has been reached on a bi-directionally movable record medium.

The invention disclosed herein is usable with and is an improvement of the invention described in copending application Ser. No. 564,480, filed Dec. 21, 1983, U.S. Pat. No. 4,688,117 and assigned to the assignee of the present invention. As described therein, record/playback devices, such as dictation and/or transcription machines, provide indications of messages, such as letters, that have been recorded. Typically, a predetermined signal, such as a special tone signal, referred to generally as a "cue" tone, is recorded under the control of the machine user at the completion of each message or letter which he dictates. Such cue tones are utilized during transcription to control the energization of a light element display to apprise the transcriptionist of the relative locations and lengths of the respective messages, or letters, that have been dictated. Examples of light element displays of the aforementioned type are described generally in U.S. Pat. Nos. 4,051,540, 4,200,893 and 4,378,577.

In addition to, or in place of, these light element displays, a numerical display may be provided to indicate the number of the particular message which has been dictated or which now is in position to be played back, as during transcription or during a review of previously dictated messages. One type of message-number display is described in copending application Ser. No. 564,480. There, when an end-of-message cue signal, referred to herein as a letter cue signal, is recorded, numerical information representing the number of messages that had been recorded up until then is updated. This numerical information is selectively accessed and displayed, thus indicating to the user the number of messages, or letters, which had been recorded previously. Thus, if the user has just completed recording message number 3, and has signified the end of that message by recording a letter cue signal, the display will indicate "3" when the message number information is accessed. As the user then records his fourth message, further access of the message number information will, nevertheless, result in the display "3". Of course, this numerical information is updated once the next (i.e. the fourth) letter cue signal is recorded.

As also described in the aforementioned copending application, cue signals representing the location of dictated instructions also may be recorded on the record medium. These cue signals are referred to as instruction cue signals; and the numerical display may be selectively controlled to indicate to the user the number of instructions which have been recorded. Thus, the display control arrangement is provided with means for storing numerical information representing the number of messages that have been recorded as well as means for storing numerical information representing the number of instructions that have been recorded. Each type of numerical information may be selectively accessed and displayed.

In the display described in the aforementioned application, a position counter is incremented and decremented as the record medium (which, typically, is a magnetic tape) moves in the forward and reverse directions, respectively. Cooperating with the record medium transport apparatus is a pulse generator which supplies pulses to a counter that provides a position count representing the position of the record medium relative to a reference location. As an example, if the record medium is a magnetic tape bi-directionally driven between supply and take-up reels, a so-called chopper wheel mechanically coupled to the supply reel generates pulses at a rate corresponding to the rotary speed of that supply reel. Hence, the position count is obtained simply by counting the chopper pulses. When a letter cue signal is recorded, the count then present in the position counter is stored at an addressed location in a memory; and each address is used as the aforementioned numerical information representing the number of the message that had just been recorded. When the tape is rewound, for example, the position counter is decremented; and when the position count is decremented to a count equal to a stored end-of-message count, the address at which that end-of-message count is stored is utilized to display the number of the letter which has been reached.

Similarly, when an instruction cue signal is recorded, the count of the position counter is stored as an instruction count at an addressed memory location, and the address of that location is used to display the number of the instruction which has been recorded. When the tape is moved to a position at which the instruction cue signal is recorded, the address at which the instruction count is stored is used to display the number of the instruction which has been reached.

It had been thought preferable to reset the aforementioned position counter each time a fresh record medium (e.g. a fresh tape cassette) is loaded into the dictation/transcription machine. By resetting the position counter, the position count then will be incremented from a reference [0000] count as the record medium advances for the purpose of dictation. Such resetting of the position count to [0000] presents no problem if the tape included in the freshly loaded cassette is fully rewound. That is, if the reference location of the newly-loaded tape corresponds to the very beginning thereof, the position counter merely will increment from its [0000] count and, since the tape cannot be rewound further, the counter cannot be decremented below its [0000] count.

However, ambiguity is introduced into the aforementioned message number display if the fresh cassette that is loaded into the dictation/transcription machine initially is positioned at some arbitrary reference location. That is, if the tape therein is not fully rewound, the resetting of the position counter to [0000] does not represent the beginning of the tape. The user may dictate one or more messages on the newly-loaded tape, resulting in the storage of end-of-message counts and the provision of numerical information representing the number of each recorded message, as in the manner mentioned above and as more fully disclosed in the aforementioned patent application. As the tape is reversed, the position counter is decremented; and when the position count becomes equal to a stored end-ofmessage count, the address at which that end-of-message count is stored is used to display the number of the letter that has been reached. It is possible, however, that the user may rewind the tape beyond the arbitrary reference location thereof, that is, beyond the starting point at which dictation commenced. The position counter then will be decremented below its [0000] count which, as is typical, results in a "roll over" of the count to a maximum value, such as [9999]. Further reversal of the tape results in further decementing of the position count from [9999] towards a lower value.

A technique that can be used for displaying the number of the message that has been reached on the tape is based upon a comparison of the position count to the stored end-of-message counts. If the position count is greater than one stored end-of-message count but is less than another, the number of the message which has been reached, that is, the number of the message then juxtaposed the record/playback transducer of the dictation/transcription machine, is the number associated with the larger end-of-message count (i.e. the number of the message is equal to, or derived from, the address at which the larger end-of-message count is stored). Alternatively, the number of the message which is displayed may be equal to the number that is associated with the smaller stored end-of-message counts plus one (i.e. the displayed message number is equal to 1 plus the address of the location at which the smaller end-of-message count is stored).

An example of the aforementioned technique for determining the number of the message which has been reached is best understood from a numerical example. Let it be assumed that the tape included in a newly-loaded cassette has not been fully rewound but, nevertheless, the position count is reset to [0000]. Let it be further assumed that a first letter cue signal is recorded at a location corresponding to a position count of [950], a second letter cue signal is recorded at a location corresponding to a count of [1140], and the user presently is in the process of dictating a third message. The position count will be greater than [1140] and, consequently, the message number display, when accessed, will indicate to the user that the tape presently is at a location corresponding to letter "3". This is because the position count is greater than the last-stored end-of-message count [1140], and this stored end-of-message count is associated with letter "2". Now, if the tape is rewound such that the position count is decremented to a count less than [1140] but greater than a count of [950], the message number display will indicate that the tape has reached letter "2". With further reverse movement of the tape, the position count continues to decrement; and when this count becomes less than [950], the message number "1" is displayed, indicating that the first message which had been dictated on the tape has been reached and is juxtaposed the record/playback transducer. Now, if the tape is further rewound to a location which precedes the reference location, that is, if the tape is rewound beyond its starting point, the position count is decremented below [0000] and "rolls over" to a count of [9999]. This count is greater than the largest stored end-of-message count [1140] and, thus, the message number which is displayed is message number "3". Thus, the user is erroneously apprised that the third message (which he had been in the process of dictating) has been reached.

The foregoing explains the ambiguity which may occur when the position count normally is reset to a zero count [0000] when a cassette is replaced, and the new cassette has not been fully rewound prior to resetting the position count. This ambiguity may erroneously indicate to the user that a particular message recorded on the tape has been reached when, in fact, the tape actually is nowhere near that message.

OBJECTS OF THE INVENTION

Therefore, it is an object of the present invention to provide an improved display which overcomes the aforenoted disadvantages and which unambiguously indicates the actual number of the particular message that has been reached on a record medium.

Another object of this invention is to provide a message number display for unambiguously indicating the number of the recorded message which is juxtaposed the transducer of a record/playback device.

A further object of this invention is to provide a method and apparatus for controlling a message number display of a record/playback device operable with a bi-directionally movable record medium, even if that medium is not initially positioned at its beginning location when loaded into the record/playback device.

An additional object of this invention is to provide a method and apparatus for controlling a position counter such that it is constrained from providing counts resulting in ambiguous indications of the number of the message that has been reached on a record medium in a device of the aforementioned type.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus are provided for unambiguously indicating the number of the particular message recorded on a bi-directionally movable record medium that is juxtaposed the transducer of a record/playback device. A position count is incremented and decremented as the record medium moves in forward and reverse directions, respectively, and end-of-message counts representing the location of the end of a message relative to an arbitrary reference location of the record medium, and derived from the position count, are stored. Information representing the number of each message whose end-of-message count is stored also is provided. The number of the message juxtaposed the transducer is determined as a function of which stored end-of-message count is greater than the position count and which stored end-of-message count is less than the position count. When the record medium used by the device is replaced, the position count is preset to a predetermined count such that, regardless of the arbitrary reference location of a new record medium that is loaded into the device, the position count will not be decremented below a count of zero when the record medium moves in the reverse direction to a location that precedes the reference location.

As a feature of this invention, the predetermined count to which the position count is preset is at least equal to the maximum position count that can be obtained if the record medium is advanced from its very beginning to its very end.

Preferably, the record medium comprises a fixed length of magnetic tape housed in a cassette and transported between supply and take-up reels.

It is a desirable feature of this invention to prevent the position count from being decremented below a zero count, which otherwise would result in a "rolled over" count that would be greater than any stored end-of-message count and that would result in an erroneous indication of the number of the message juxtaposed the transducer of the record/playback device (e.g. if n messages have been recorded, an erroneous indication that message number "n+1" is juxtaposed the transducer).

BRIEF DESCRIPTION OF THE DRAWINGS

The following detailed description, given by way of example, and not intended to limit the invention solely to the illustrated embodiments, should be read in conjunction with the accompanying drawings in which.

DETAILED DESCRIPTION OF A PREFERRED EMBODIMENT

The present invention, to be described, is particularly adapted for use in a portable, battery-operated dictate device, although so-called desk-top dictation/transcription devices may be used with this invention. However, as will be apparent, this invention is equally applicable to a sound recorder that may be used for other applications and need not be limited solely for use as a dictate machine. The record/playback device described herein preferably is used with a miniature, thumb-sized, capstan-driven magnetic tape cassette, such as the tape cassette described in U.S. Pat. Nos. 4,476,510 and 4,443,827. However, it should be readily appreciated that, if desired, the record/playback device described herein need not be limited solely for use with magnetic tape cassettes but, rather, may be used with other record media, such as magnetic discs which may be rotatably driven and may be selectively engaged by a magnetic head that is moved in the forward and reverse directions. Also, the record medium may comprise a bubble-memory device wherein forward and reverse "movements" are simulated by forward and reverse shifting of "bubbles" which, as is known, represent information. Similarly, the record medium may comprise a solid state memory "chip" wherein movements are simulated by shifting the addresses of locations in which digitized information is written and read. As used herein, the expression "movable record medium" is intended to include the foregoing media and other analogous media for recording/reproducing or storing/reading information.

Figure 1:
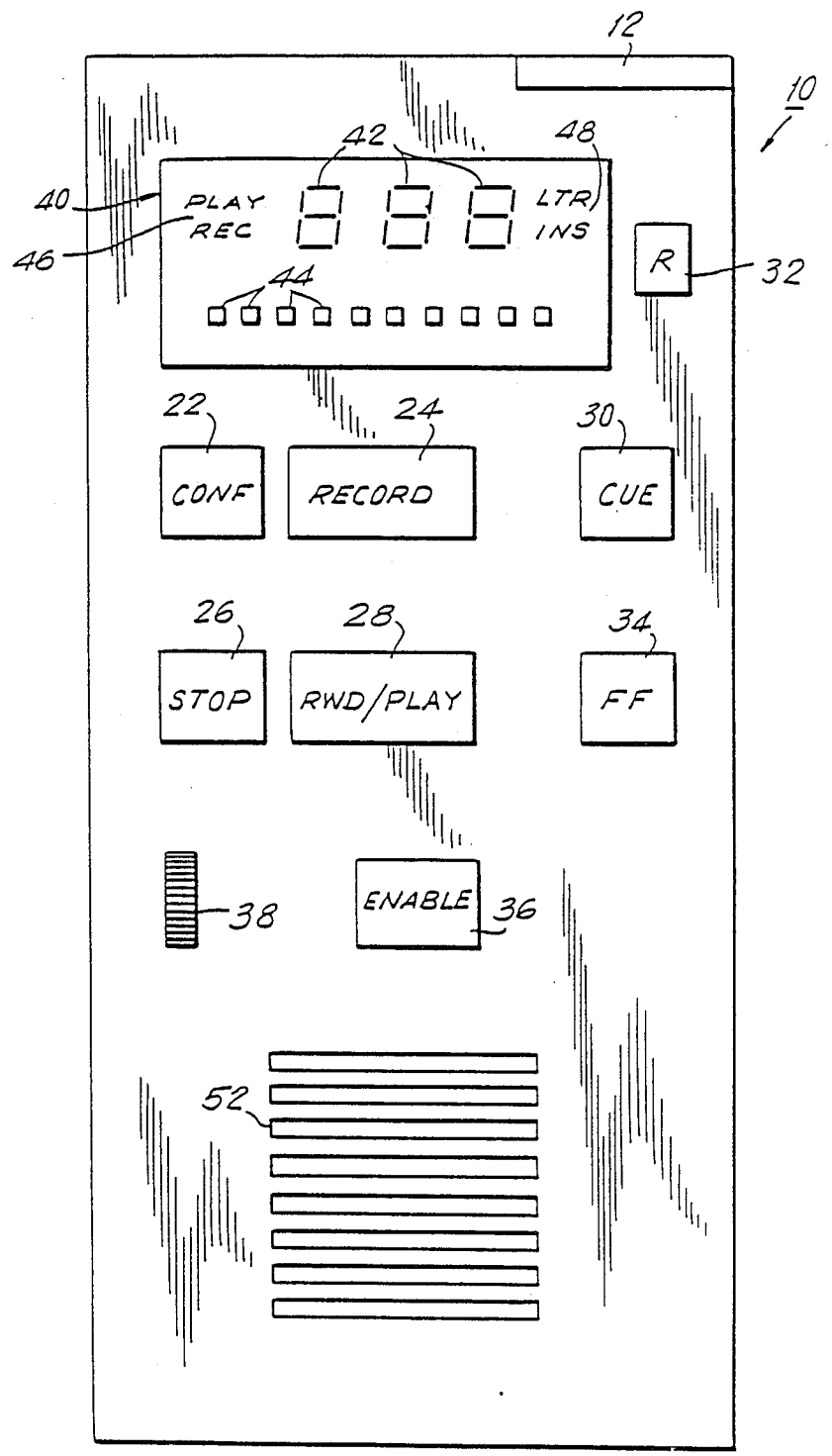
FIG. 1 is a schematic representation of a front view of a typical embodiment of the record/playback device in which the present invention may be used.

For convenience, the record/playback device is described herein in the context of a portable, battery-operated dictate machine. As shown in FIG. 1, device 10 is provided with a plurality of manually operable controls, plural displays, a microphone 12 (illustrated, as an example, at the upper right-hand corner of the device) and a speaker 52. In one embodiment, the manually operable controls comprise push-button elements, each being selectively operable to control or initiate a corresponding function. Alternatively, these controls may be formed as touch-sensitive switches adapted to produce signals representing the actuation thereof when touched by the user of the device. In either embodiment, a respective signal is produced in response to the operation of a corresponding control element, and this signal is produced for so long as that element is operated. Upon release of the element, the signal terminates. Suitable push-buttons, switches and the like for providing these functions are conventional and are well known.

The displays, identified as displays 40, preferably are formed as LCD display devices which, as is conventional, require relatively little electrical energy to provide suitable indications; and, thus, advantageously impose little drain on the electrical storage battery which is used to energize device 10. Alternatively, other visual indicator display devices, such as LED devices, electroluminescent devices, and the like may be used to implement display 40.

Although not shown in FIG. 1, it will be appreciated that, in the embodiment described herein, device 10 is operable with a removable record medium. As mentioned above, this record medium preferably comprises a miniature, thumb-sized tape cassette. On the reverse, or backside of device 10 (not shown) there is provided a door to a cassette-receiving compartment in which the cassette is contained for operation. A suitable switch (also not shown) may be coupled to this door or may be contacted by a cassette loaded into the cassette compartment so as to produce a suitable signal when the cassette is removed. As an alternative, this signal may be produced when a fresh cassette is loaded into the compartment. As will be described, this signal functions as a "preset" signal.

The manual controls provided with record/playback device 10 include various switches, such as pushbutton switches which, for convenience, are referred to merely as buttons. These buttons include a conference record button 22, a momentary record button 24, a stop button 26, a rewind/play button 28, a cue/erase button 30, a reset/mode button 32, a fast forward button 34 and a keyboard enable button 36. For convenience, these elements are referred to merely as buttons. In addition, a volume adjustment control knob 38, such as a potentiometer, also is provided.

Conference record button 22 and momentary record button 24 are manually operable to dispose record/playback device 10 in the so-called "conference record" and "momentary record" modes of operation, respectively. When disposed in the conference record mode, the gain in the recording electronics is increased such that device 10 can be used to record a "conference" among individuals who are disposed at some distance from microphone 12. In the momentary record mode, the gain of the recording electronics is reduced, thus making the pick-up sensitivity of the device less sensitive. In the momentary record mode, it is expected that the user will hold device 10 in close proximity to his mouth. With reduced pick-up sensitivity, ambient noises will not be recorded and, thus, such noises will not interfere with the user's dictation. Furthermore, the operation of record button 24 establishes the momentary record mode for so long as this button is operated. Upon release of the record button, the mode of device 10 is changed over to an inactive, or stop, mode. However, when conference record button 22 is operated, the conference record mode is established, and this mode remains "latched" even when the conference record button is released.

Rewind/play button 28 is adapted, when operated, to dispose device 10 in a rewind mode, whereby the magnetic tape is driven in the reverse direction at a relatively high rate of speed. Upon release of button 28, the direction in which the tape is driven is reversed, and the rate at which the tape now is moved in the forward direction is reduced to the speed at which information can be played back. It is appreciated that this speed is equal to the speed at which the tape is driven when either conference record button 22 or momentary record button 24 is operated. Stop button 26, when operated, functions to change over device 10 from an active mode (e.g. record, play, etc.) to an inactive, or stop mode. It is appreciated that, in this inactive or stop mode, the tape is maintained stationary.

Cue/erase button 30 is adapted, when operated momentarily, to record a "cue" signal on the magnetic tape and, additionally, to provide a cue indication which represents the location along the tape at which the cue signal is recorded. This cue indication enables the user to rapidly move the tape in either the rewind or fast forward modes to the location at which that cue signal is recorded. Preferably, cue indications representing "letter" and "instruction" cues, respectively, may be recorded by selectively operating the cue button. For example, the "letter" cue indication is provided, and a corresponding "letter" cue signal is recorded, upon a single momentary operation of cue button 30. This designates the end of a letter, or message, or segment of dictation, that has been recorded. Upon a repeated momentary operation of the cue button within a predetermined time period, for example, if the cue button is operated twice within a period of 1 second, an "instruction" cue is indicated and recorded to designate the location of a recorded instruction.

As will be described below, display 40 includes a plural-digit (e.g. a 3-digit) numerical display 42 which normally functions as a tape counter to provide a numerical indication of the amount of tape which has been transported, thereby representing the present position of the tape. Reset/mode button 32 is adapted, when operated or pushed for a prolonged period of time, to reset numerical display 42. When the reset/mode button is operated momentarily, the information displayed by numerical display 42 is changed over, or toggled, to display the number of the letter, or message that has been recorded, and/or the number of the particular letter or message which is in position to be (or is in the process of being) played back. Also, if device 10 is in its record or fast forward or rewind mode, numerical display 42 displays the number of the instruction that has been recorded or that has been reached, respectively.

Fast forward button 34, when operated, functions to dispose device 10 in its fast forward mode in which the magnetic tape is transported at a relatively rapid speed in the forward direction. In this mode, when the tape has been transported to the end of a letter (or message) or to a location at which an instruction had been recorded, the tape transport provided in device 10 is temporarily interrupted so as to "pause" at that location and the number of the next letter or of the instruction which has been reached is displayed. Hence, the tape may be rapidly transported to the beginning of a letter or an instruction. Similarly, the tape may be rapidly transported in the reverse direction to a letter or instruction upon the operation of rewind/play button 28. That is, when device 10 is disposed in the rewind mode of operation, the tape is rapidly rewound until the end of a letter (or message) or the location at which an instruction had been recorded is reached, whereupon the tape transport "pauses" thereat and the number of the next letter or of the instruction is displayed.

Enable button 36 functions in a manner analogous to a POWER ON switch. Device 10 is provided with a programmed microprocessor which is responsive to the selective actuation of the illustrated control buttons to control both the operation of the device and the information displayed by display 40. The manner in which this microprocessor operates is described in detail in copending application Ser. No. 564,480. When not in use, device 10 and the microprocessor therein are disposed in a dormant, or non-operating condition. When the device is to be operated by the user, enable button 36 is operated so as to change over the device from its dormant condition to an inactive mode, thus awaiting subsequent actuation of a control button. As will be described below, when device 10 is disposed in its inactive mode, which corresponds to a "stop" mode, both the device and the microprocessor will change over to the dormant condition automatically if no active mode is initiated within a predetermined time period. Stated otherwise, when the device is disposed in its stop mode, it will revert to its dormant condition unless conference record button 22, momentary record button 24, rewind/play button 28 or fast forward button 34 is operated within the aforementioned time period. The operation of enable button 36 will bring the microprocessor out of the dormant condition.

As mentioned above, display 40 is provided with a plural-digit numerical display 42. As one example thereof, numerical display 42 may be comprised of a 3-digit display, each digit being represented by a 7-segment LCD element or other conventional visual indication numerical display device. This numerical display is adapted to be incremented and decremented as the tape is driven so as to provide a numerical indication of the amount of tape which has been transported.

Display 40 also is provided with a bar graph, or index, display 44, a "record/play" indicator 46, and a "letter/instruction" indicator 48. Bar graph display 44 is comprised of a plurality of individual elements or segments, such as LCD segments, which are adapted to be selectively energized to provide an indication of the approximate quantity of tape which has been transported, thereby providing a bar graph display of the present position of the tape. As an example, if bar graph display 44 is formed of ten segments, each segment may represent approximately 10% of the overall length of tape; and as successive tape is transported in the forward direction, additional ones of segments 44 are energized. Preferably, the segments which comprise the bar graph display are selectively energized to provide a left-to-right shifting effect when device 10 is disposed in the fast forward mode; and these segments are energized to provide a right-to-left shifting effect when the device is disposed in its rewind mode.

"Record/play" indicator 46 is adapted to be energized to display REC when device 10 is disposed in its record mode and to display PLAY when the device is disposed in its playback mode. This provides the user with an indication of the particular mode of operation in which the device is disposed. "Letter/instruction" indicator 48 is adapted to display LTR when a letter cue signal is recorded and to display INS when an instruction cue signal is recorded. Also, upon the momentary operation of reset/mode button 32, the indication LTR is displayed together with a numerical indication by display 42 to indicate the number of the particular letter then juxtaposed the record/playback head of device 10. Additionally, when the record medium with which device 10 is used is rewound or advanced rapidly to the end of a previously recorded letter, or to a previously recorded instruction, the indication LTR or INS, respectively, and the number of that letter or instruction which has been accessed are displayed.

In the preferred embodiment, the record medium which is used with device 10 is a capstan-driven cassette having a magnetic tape which extends between supply and take-up reels. A single, bi-directional two-speed motor is provided to drive the capstan and, also, to drive supply and take-up reel spindles, respectively. A relatively simple transmission, such as a belt-drive, is used to couple the motor to the capstan and also to the supply and take-up reel spindles. Preferably, suitable clutches are provided in the spindles to permit the tape to be bi-directionally driven between the reels.

A pinch roller is mounted on a movable device, referred to herein as an actuator, in a manner similar to that described in U.S. Pat. No. 4,547,821. During record and play modes of operation, the actuator is energized such that the pinch roller fully engages the capstan, thereby "pinching" the tape therebetween. The capstan is driven by energizing the motor in the forward direction, thereby transporting the tape from the supply reel to the take-up reel. A suitable record/playback head also is mounted on the actuator so as to be in good magnetic contact with the tape when the pinch roller is engaged. Consequently, information may be recorded on or played back from the tape by this head.

As described in copending application Ser. No. 564,480, when letter cue signals are recorded, the instantaneous count of the tape counter, also referred to herein as a position counter, is stored in an addressed location of a letter cue memory. As a simplified example, the position count is stored in the first addressable location of the letter cue memory when the first letter cue signal is recorded, thus resulting in the storage of an end-of-message count which represents the location of the end of the first message. After the user completes his dictation of the second message, another letter cue signal is recorded; and the position count is stored as an end-of-message count in the second addressable location of the letter cue memory. A similar operation is carried out for the third, fourth, and other end-of-message counts. Thus, the particular address at which an end-of-message count is stored represents the number of the message associated with that stored end-of-message count.

Figures 2, 3, 4, 5:
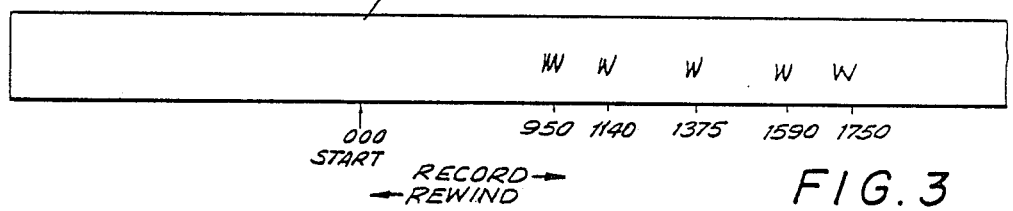
FIG. 2 is a schematic representation of a memory in which are stored end-of-message counts.
FIG. 3 is a schematic representation of a record medium having messages recorded thereon.
FIGS. 4 and 5 are schematic representations of memories in which end-of-message counts are stored.

A schematic representation of a letter cue memory 14 in which are stored five separate end-of-message counts is illustrated in FIG. 2. As a numerical example, position count [950] is stored at address 1, position count [1140] is stored at address 2, and so on, as illustrated.

As will be explained, the letter cue memory location addresses serve as information representing the number of the message whose end-of-message count is stored at that address. This information, the memory location address, is used to display the number of the message then juxtaposed the transducer of the record/playback device, that is, the number of the message that has been reached. One technique for displaying the number of the message that has been reached is described in copending application Ser. No. 564,480. Another technique that can be used to display the number of the message that has been reached is based upon a determination of which stored end-of-message count is less than the instantaneous position count and which stored end-of-message count is greater than that position count. If the position count is represented as x, then the end-of-message counts that are stored in the respective cue memory addresses are read out, in sequence, and each end-of-message count is compared to position count x. When it is determined that x is greater than the end-of-message count read out of one address location but is less than the end-of-message count read out from the next address location, it is concluded that the number of the message then juxtaposed the transducer is the message associated with the larger end-of-message count. The address at which is stored this larger end-of-message count is displayed as the number of the message that has been reached.

As an alternative, the difference between x and each stored end-of-message count that is greater than x is sensed, and the address at which is stored the end-of-message count having the smallest difference is used to indicate the number of the message that has been reached.

As yet another alternative, each stored end-of-message count is read out from letter cue memory 14 and is compared to x. The address of the memory location at which is stored the last end-of-message count that is less than x is incremented by 1 and used to display the number of the message that has been reached.

In accordance with any of the foregoing alternatives, if it is assumed that x equals [1400], this position count is compared to each of the end-of-message counts stored in letter cue memory 14. It is seen that, in accordance with this example, x is greater than the end-of-message count stored at address 3, but x is less than the end-of-message count stored at address 4. Hence, it is concluded that some portion of message "4" is juxtaposed the transducer, and address "4" is displayed as the number of the message which has been reached.

FIG. 3 is a schematic representation of a length of magnetic tape 20 upon which five messages have been recorded with letter cue signals designating the ends of those messages recorded at locations corresponding to position counts [950], [1140], [1375], [1590] and [1750], consistent with the schematic representation of the letter cue memory of FIG. 2. It is, of course, recognized that the position count may be an actual count that is obtained by a counter which counts chopper pulses that are generated as magnetic tape 20 is driven, and as described more particularly in copending application Ser. No. 564,480.

Normally, when a cassette is removed from the record/playback device or when a fresh cassette is loaded thereinto, the tape position counter is reset to an initial count [0000]. This automatic resetting may be achieved by a suitable switch that is opened upon the removal of the cassette or that is closed upon the insertion of a fresh cassette. Although no ambiguity in the number of the message that is displayed will occur if the position counter is reset to [0000] at the very beginning of the magnetic tape, that is, if the tape of a fresh cassette is fully rewound before being loaded into the device, ambiguity may result in the display of the message number if magnetic tape 20 has been partially rewound, or partially used, prior to its loading into the record/playback device. Let it be assumed that, as shown in FIG. 3, an arbitrary reference location is assumed by the magnetic tape at the time that it is loaded into the device. Hence, although a portion of the tape already has been transported from its supply reel to its take-up reel, the position counter nevertheless is reset to a count of [0000] when the cassette is loaded into the device, this count identifying the reference location of the magnetic tape, as illustrated in FIG. 3. Let it be further assumed that tape 20 is transported in the usual manner, and that letter cue signals are recorded at locations represented by end-of-message counts [950], [1140], and so on, as is also illustrated.

So long as magnetic tape 20 is not rewound to a location that precedes reference location [0000], a proper display of the message then juxtaposed the transducer will be provided, as discussed above. However, if tape 20 is rewound sufficiently, the position count will decrement to the count [0000] and then will reach the count [9999] from which it will be further decremented. Thus, after passing beyond the reference location of tape 20, the instantaneous count of the position counter will exceed the maximum end-of-message count that is stored in letter cue memory 14. When this greater position count is compared to the end-of-message counts read out from the letter cue memory, the message number determining operation will erroneously conclude that the tape is at some position downstream of the location corresponding to end-of-message count [1750], and it will conclude that message "6" has been reached. Thus, even though the tape merely has been rewound to a location that precedes the reference location, the message number display, if accessed, will indicate that message "6" is juxtaposed the transducer.

The foregoing ambiguity is removed by the present invention in which, rather than reset the position counter to the count [0000] when a cassette is replaced (i.e. when a previously used cassette is removed or when a fresh cassette is loaded), the present invention proceeds by presetting the position count to a predetermined count which cannot be decremented to [0000] even if the entire length of tape 20 is rewound. Thus, if tape 20 had been fully wound onto the take-up reel at the time it is loaded into the record/playback device, thus requiring the full length of tape to be rewound, the preset position counter, although decremented, will not be decremented below the count [0000]. Hence, the position count will not "roll over"; and an ambiguous indication of the number of the message that has been reached on tape 20 will not occur.

Before describing the manner in which the microprocessor that is used with display 40 operates, reference is made to FIGS. 4 and 5 which schematically represent other embodiments of a letter cue memory 16 or a letter/instruction cue memory 18. In the FIG. 4 embodiment, in addition to storing each end-of-message count at a respective addressed location, the number of the message whose end is represented by the stored count also is stored in the same (or associated) memory address. Thus, when an end-of-message count is read out from memory 16, the number of the letter associated with that count also is read out. When using the embodiment of FIG. 4, the read-out message number (referred to as a letter count) may be used in place of the memory address to indicate the number of the message that has been reached. The schematic illustration in FIG. 5 of cue memory 18 is similar to that shown in FIG. 4, except that in the FIG. 5 embodiment each addressable location stores, in addition to a tape count, the number of the message or instruction that is associated with that tape count. For example, in the first addressable location of cue memory 18, the end-of-message count [950] is stored, together with a letter count $18L_1$ which, in this example, represents that the end of the first message is recorded at position [950]. Similarly, in the second addressable location of cue memory 18 is stored the count [1140] together with a letter count $18L_2$. This letter count $18L_2$ represents that the end of the second message (or letter) is recorded at position count [1140].

The count [1250] is stored at the third addressable location of cue memory 18, and this position count is associated with an instruction count $18I_1$ which represents that the first instruction is recorded at position [1250].

In similar manner, letter count $18L_3$ is stored at the same address as position count [1375], representing that the end of the third message is recorded at this position; and instruction $18I_2$ is recorded at the same address as position count [1450], representing that this is the location at which the second instruction is recorded. Alternatively, the letter or instruction counts may be stored at addresses which are associated (e.g. linked) with the addresses at which the position counts are stored. When the embodiment shown in FIG. 5 is used, the number of the message that is associated with a stored end-of-message count or, alternatively, the number of an instruction that is associated with a stored position count, is read out and used to display the number of the message (or letter) or the number of the instruction that has been reached. It is appreciated that the number of the message or instruction is determined as a function of the comparison between the instantaneous position count and the counts stored in cue memory 18. If one end-of-message count is greater than the instantaneous position count and the next successive end-of-message is less than the position count, the message number associated with the greater end-of-message count is utilized to indicate the number of the message which has been reached.

Figure 6:
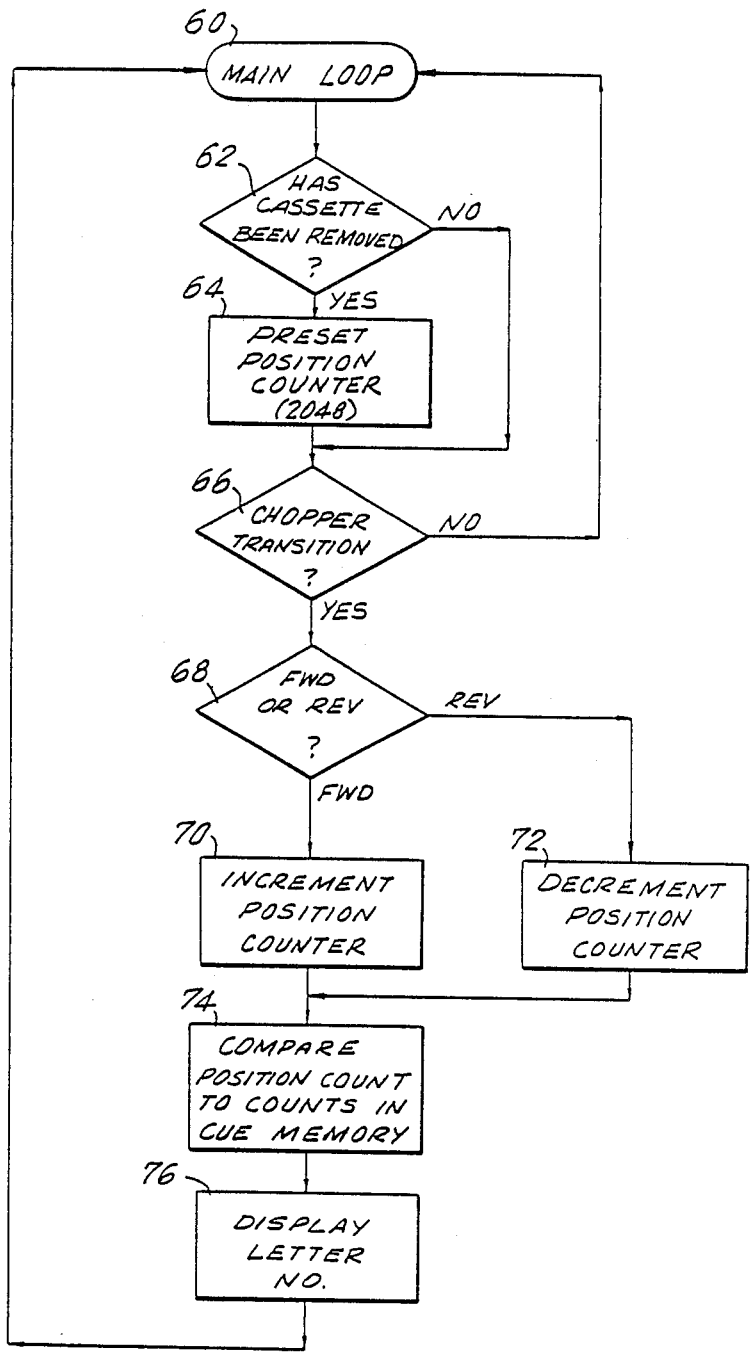
FIG. 6 is a flow chart corresponding to the programmed set of instructions that are used by processor apparatus in accordance with the present invention to control the operation of the message number display.

Turning now to the flow chart shown in FIG. 6, it will be appreciated that only the relevant portion of the overall program of the microprocessor is described. This microprocessor may be similar to the one described in copending application Ser. No. 564,480, and the overall program thereof may be similar to that shown in FIG. 2 of that application. This overall program is referred to in FIG. 6 as main loop 60. FIG. 6 also illustrates the routine that, for example, may be entered from the main loop, this routine serving to avoid ambiguities in determining the particular number of the message which is juxtaposed the record/playback transducer. The routine shown by the flow chart in FIG. 6 may be executed periodically, for example, once during each cycle of main loop 60, or the routine may be executed more or less often, as may be desired. The periodicity of the execution of this routine need not be dependent or contingent upon the occurrence of other events but, rather, may simply be designed into the microprocessor program.

In the routine shown in FIG. 6, inquiry 62 first is made as to whether a cassette (or other record medium) has been removed from the record/playback device. If this inquiry is answered in the affirmative, the routine advances to instruction 64 whereat the position counter is preset to a predetermined count. As one numerical example, if the record/playback device is used with a cassette having a fixed length of tape on which thirty minutes of dictation may be recorded, it is expected that less than 2,048 chopper pulses will be generated if the entire length of tape is transported. Thus, by presetting the position counter to a count of [2048], it is recognized that, even if the entire length of tape is rewound, the position counter will not be decremented below the count [0000]. It is to be noted here that the position counter should have a counting capacity sufficient to be incremented to a count of [4096]. More generally, the position counter should be able to be incremented to a count that is twice the preset count. Hence, if a fresh cassette happens to be fully rewound before being loaded into the device, the counter can be incremented from its preset count to a count of, for example [4096], or twice the preset count, when the entire length of tape is transported.

After presetting the position counter, or if inquiry 62 is answered in the negative, the routine advances to inquiry 66 to determine if a chopper pulse transition has occurred. A chopper pulse transition is represented as a transition from a binary "1" level to a binary "0", or vice versa, in the voltage output generated from the chopper wheel that, as described above, preferably is mechanically coupled to the supply reel drive spindle of the record/playback device. If a chopper pulse transition has not occurred, the routine returns to main loop 60. However, if a chopper pulse transition is present, the routine advances to inquiry 68 to determine if the tape is transported in the forward or reverse direction.

If tape is being transported in the forward direction, the position counter is incremented, as at 70; and this position counter is decremented, as at 72, if tape is being transported in the reverse direction. After the counter is incremented or decremented, the routine advances to instruction 74 (which may comprise a set of instructions), whereat the position count is compared to the end-of-message counts stored in the cue memory, as discussed above. Then, depending upon which end-of-message count is greater than the position count and which end-of-message count is less than the position count, the appropriate number of the letter that has been reached is displayed, as at 76. The routine then returns to main loop 60.

It is recognized that the position counter is preset to the predetermined count of, for example, 2,048 (or greater), when a cassette has been removed from the record/playback device. If a cassette has not been removed, this preset operation is not carried out. As an alternative, the position counter may be preset to the predetermined count when a fresh cassette is loaded into the device. In either embodiment, it is sufficient if the position counter is preset to the predetermined count before any forward movement of tape is initiated. It is appreciated, therefore, that other means may be used to preset the position counter accordingly. Although conventional switches or other sensing devices responsive to the removal or insertion of a cassette may be relied upon, other means, such as a forward movement sensor, a sensor responsive to the first chopper pulse generated when tape moves in the forward direction, a sensor responsive to a control button which commands forward tape movement, or the like, may be used.

While the present invention has been particularly shown and described with reference to a preferred embodiment, it will be readily appreciated that various changes and modifications may be made without departing from the spirit and scope of the invention. For example, other record media may be used with this invention, such as a magnetic disk, a bubble memory, a solid-state semiconductor memory, or the like. Also, the position counter may be preset to any desired count, provided that this count will not be decremented below a zero count if the entire length of record medium is rewound. Further, any suitable means, such as, but not limited to, those described above may be used to preset the position counter, as when the record medium is removed from or loaded into the record/playback device, or at any other suitable time. While this careful preset operation preferably should be carried out automatically, manual means may be provided for presetting the counter, such as, in addition to those described above, the manual operation of the enable button.

It is intended that the appended claims be interpreted as including the foregoing as well as other changes and modifications.

What is claimed is:

1. An improvement in a position counting method used with a bi-directionally movable record medium on which at least one message is recorded, the medium being loaded into a record/playback device and juxtaposed the transducer of said record/playback device, and in which the medium may not be fully rewound when loaded thereinto and advanced for a record/playback operation, said method including the steps of incrementing and decrementing a position count as said record medium moves in forward and reverse directions, respectively, from an arbitrary reference location thereof exhibited when loaded into said record/playback device, said position count being preset to a predetermined count corresponding to said arbitrary reference location; storing end-of-message position counts representing respective locations relative to said arbitrary reference location at which ends of messages are recorded; and determining which stored end-of-message position count is greater than a position count representing the present position relative to said arbitrary reference location of the record medium and which stored end-of-message position count is less than said position count; said improvement avoiding an ambiguity in determining which stored end-of-message position count is greater or less than said position count in the event that said record medium is rewound behind the arbitrary reference location thereof; said improvement comprising selecting said predetermined count to have a value great enough that, regardless of an arbitrary reference location of a new record medium loaded arbitrary reference location of a new record medium loaded into said record/playback device, said position count is not decremented below a count of zero when said record medium moves in the reverse direction to a location which precedes said reference location.

2. The improvement of claim 1 wherein said predetermined count is at least equal to the maximum position count which would obtain if said record medium is advanced from its beginning to its end.

3. The improvement of claim 1 wherein said position count is preset when the record medium then present in said record/playback device is removed therefrom.

4. The improvement of claim 1 wherein said position count is preset when a new record medium is loaded into said record/playback device.

5. The improvement of claim 1 wherein at least one and typically several messages are recorded successively on said record medium, and wherein each end-of-message position count is associated with information representing the number of that message such that the number of the message juxtaposed said transducer is determined by comparing the present position count to those end-of-message position counts which are greater and less than said present position count.

6. The improvement of claim 5 wherein each end-of-message position count is stored in a respective addressable storage location, and the information representing the number of each message is the address of each said storage location.

7. The improvement of claim 5 wherein each end-of-message position count is stored in a memory, and the information representing the number of each message is numerical information appended to an associated end-of-message count.

8. In a record/playback device having a transducer for recording messages on and playing back said messages from a bi-directionally movable record medium loaded into the record/playback device, which medium may not be fully rewound when loaded thereinto and advanced for a record/playback operation, apparatus including counter means for providing a position count that is incremented and decremented as said record medium moves in forward and reverse directions, respectively, from an arbitrary reference location thereof exhibited when loaded into said record/playback device; counter preset means for presetting said counter means to a predetermined position count corresponding to said arbitrary reference location; storage means for storing the position count present when a message is ended, each stored count being an end-of-message count representing a location on the medium of the end of a message relative to said arbitrary reference location; and means for determining which end-of-message count is greater than a position count representing the present position of the record medium relative to said arbitrary reference location and which end-of-message count is less than said position count; the improvement avoiding an ambiguity in determining which stored end-of-message count is greater or less than said position count in the event that said record medium is rewound behind the arbitrary reference location thereof, wherein said improvement comprises said counter preset means presetting said counter means to said predetermined position count, said predetermined position count being selected to have a value great enough that, regardless of an arbitrary reference location of a new record medium loaded into said device, said position count is not decremented below a count of zero when said record medium moves in the reverse direction to a location which precedes said reference location.

9. The invention of claim 8 wherein said predetermined count is at least equal to the maximum position count to which said counter means would be incremented if said record medium is advanced from its beginning to its end.

10. The invention of claim 8 wherein said counter preset means comprises sensing means for sensing the removal of a record medium from said device; and means responsive to said sensing means for presetting said counter means.

11. The invention of claim 8 wherein said counter preset means comprises sensing means for sensing the loading of a new record medium into said device; and means responsive to said sensing means for presetting said counter means.

12. The invention of claim 8 further including means for providing message number information to identify the number of each message whose end-of-message count is stored in said storage means; and display means for displaying the number of the message juxtaposed said transducer as a function of the determination of which end-of-message counts are greater and less than said position count.

13. The invention of claim 12 wherein said display means includes means for determining the end-of-message count that is less than said position count by the smallest difference therebetween; and means for displaying a message number derived from the message number information which identifies the number of the message having the last-mentioned end-of-message count.

14. The invention of claim 12 wherein said storage means comprises an addressable memory having respective storage locations for storing end-of-message counts; and wherein said message number means comprises address generating means for generating memory addresses to read out the stored end-of-message counts for comparison with said position count; each address representing the number of the message whose end-of-message count is stored in the addressed location.

15. The invention of claim 12 wherein said storage means comprises an addressable memory having respective storage locations for storing end-of-message counts and message number information; and address generating means for generating memory addresses to read out the stored end-of-message counts for comparison with said position count and to read out the message number information from said storage locations, whereby the number of the first message whose end-of-message count is greater than said position count is displayed.

* * * * *